US011011055B2

(12) United States Patent
Jacobs et al.

(10) Patent No.: US 11,011,055 B2
(45) Date of Patent: May 18, 2021

(54) COLLECTING MOVEMENT ANALYTICS USING AUGMENTED REALITY

(71) Applicant: Verizon Patent and Licensing Inc., Arlington, VA (US)

(72) Inventors: Philip C. Jacobs, Salem, NH (US); Ranxing Li, Cambridge, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 256 days.

(21) Appl. No.: 16/360,584

(22) Filed: Mar. 21, 2019

(65) Prior Publication Data
US 2020/0302784 A1 Sep. 24, 2020

(51) Int. Cl.
*G08G 1/01* (2006.01)
*G06T 19/00* (2011.01)
*G06T 7/70* (2017.01)

(52) U.S. Cl.
CPC ............ *G08G 1/0145* (2013.01); *G06T 7/70* (2017.01); *G06T 19/006* (2013.01); *G08G 1/0108* (2013.01); *G08G 1/0141* (2013.01); *G06T 2207/30236* (2013.01)

(58) Field of Classification Search
CPC .. G08G 1/0145; G08G 1/0141; G08G 1/0108; G06T 19/006; G06T 7/70; G06T 2207/30236
See application file for complete search history.

(56) References Cited

U.S. PATENT DOCUMENTS

| | | | | |
|---|---|---|---|---|
| 9,197,863 | B2 * | 11/2015 | Ozaki | H04N 7/18 |
| 10,354,404 | B2 * | 7/2019 | Kuznetsov | B60K 35/00 |
| 10,458,807 | B2 * | 10/2019 | Kreter | G01C 21/3647 |
| 10,488,215 | B1 * | 11/2019 | Yu | G06T 19/006 |
| 2013/0286206 | A1 * | 10/2013 | Ozaki | H04N 7/18 348/148 |
| 2014/0063064 | A1 * | 3/2014 | Seo | G08G 1/0967 345/633 |
| 2016/0378861 | A1 * | 12/2016 | Eledath | G06K 9/00718 707/766 |
| 2017/0090196 | A1 * | 3/2017 | Hendron | G02B 27/0101 |
| 2017/0263014 | A1 * | 9/2017 | Kuznetsov | G01S 19/38 |
| 2017/0343375 | A1 * | 11/2017 | Kamhi | G01C 21/3407 |
| 2019/0026956 | A1 * | 1/2019 | Gausebeck | G06T 7/579 |
| 2019/0206258 | A1 * | 7/2019 | Chang | G08G 1/123 |
| 2019/0226866 | A1 * | 7/2019 | Chang | G01C 21/3638 |

* cited by examiner

*Primary Examiner* — Dale W Hilgendorf

(57) ABSTRACT

A movement analytics platform can generate instructions for collecting video data from a site that includes a roadway. The instructions can be provided to a device having augmented reality capabilities, wherein the instructions include content displayed by the device to indicate an area at the site that an operator of the device is to position within a field of view of a camera. A data feed received from the device can include video data corresponding to the area and contextual data to annotate the video data based on observations by the device operator. The data feed can be processed to derive movement analytics associated with the area at the site (e.g., classifications, locations, speeds, travel directions, and/or the like for one or more objects depicted in the video data). The device can be provided with additional augmented reality content based on the movement analytics.

20 Claims, 8 Drawing Sheets

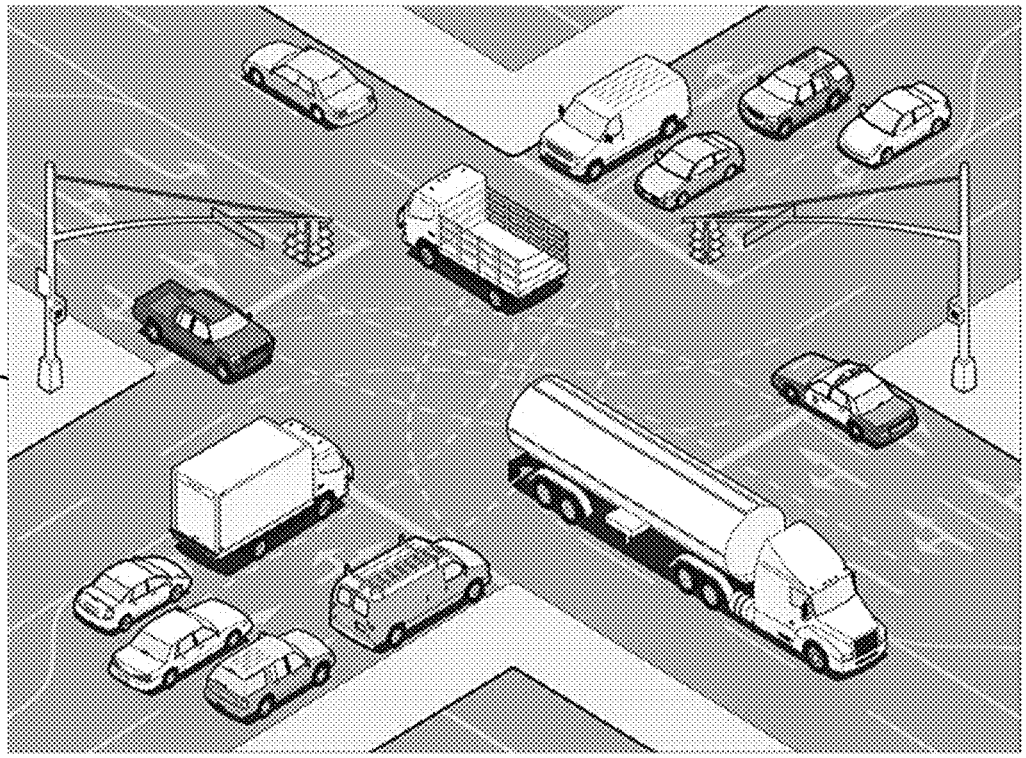
100
Site of Interest
115
Display data collection instructions using augmented reality
110
Provide instructions based on operator data collection workflow
105
Generate operator data collection workflow
Movement Analytics Platform
FIG. 1A

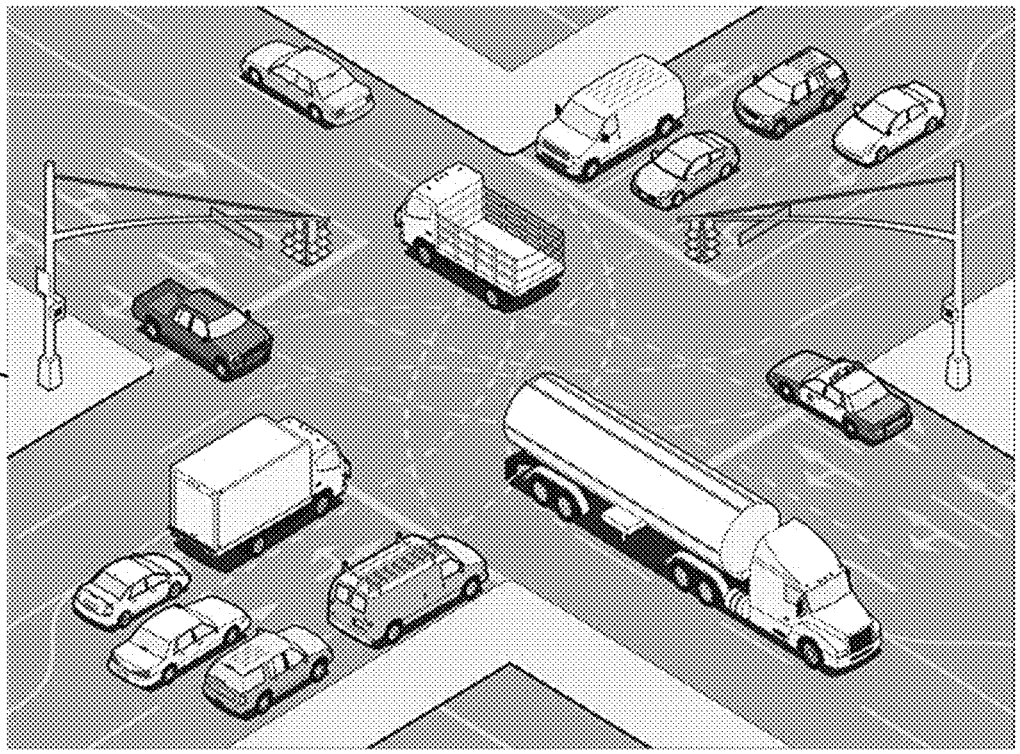
100
Site of Interest
120
Capture video data from site of interest
125
Annotate video data using contextual data related to observations at site of interest
130
Provide data feed including video data and contextual data related to observations at site of interest
135
Process data feed to derive movement analytics
Movement Analytics Platform
FIG. 1B

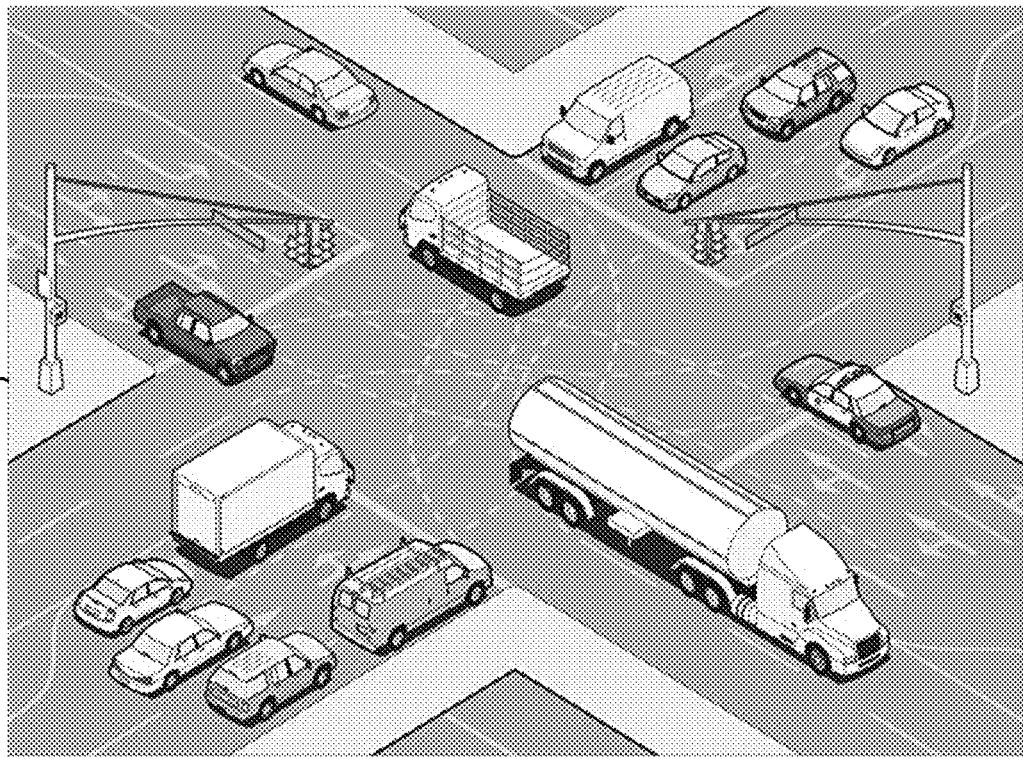
Site of Interest
100
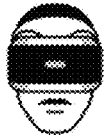
145
Provide augmented reality content based on movement analytics (e.g., detected objects, circumstances of interest, obscured areas, suggested repositioning)
140
Perform one or more actions based on processed data feed
Movement Analytics Platform
FIG. 1C

COLLECTING MOVEMENT ANALYTICS USING AUGMENTED REALITY

BACKGROUND

Traffic flow refers to the study of movements and interactions involving travelers (e.g., pedestrians, drivers, cyclists, and/or the like), vehicles (e.g., cars, trucks, motorcycles, bicycles, and/or the like), and infrastructure (e.g., roadways, signage, traffic control devices, crosswalks, and/or the like). Traffic flow studies generally aim to understand and develop an optimal roadway transport network with efficient traffic movement and minimal problems relating to traffic congestion, safety hazards, parking availability, and/or the like. Although traffic often behaves in a complex and nonlinear way, with vehicles tending to display cluster formation and shock wave propagation due to variation in the reactions of individual drivers, drivers overall tend to behave within a reasonably consistent range, which allows traffic streams to be roughly represented mathematically. For example, traffic flow is sometimes represented using relationships between characteristics that relate to flow, density, and velocity, which can provide useful insights to help plan, design, and operate roadway facilities.

BRIEF DESCRIPTION OF THE DRAWINGS

FIGS. 1A-1C, 2, and 3 are diagrams of one or more example implementations described herein.

DETAILED DESCRIPTION OF PREFERRED EMBODIMENTS

Figure 2:
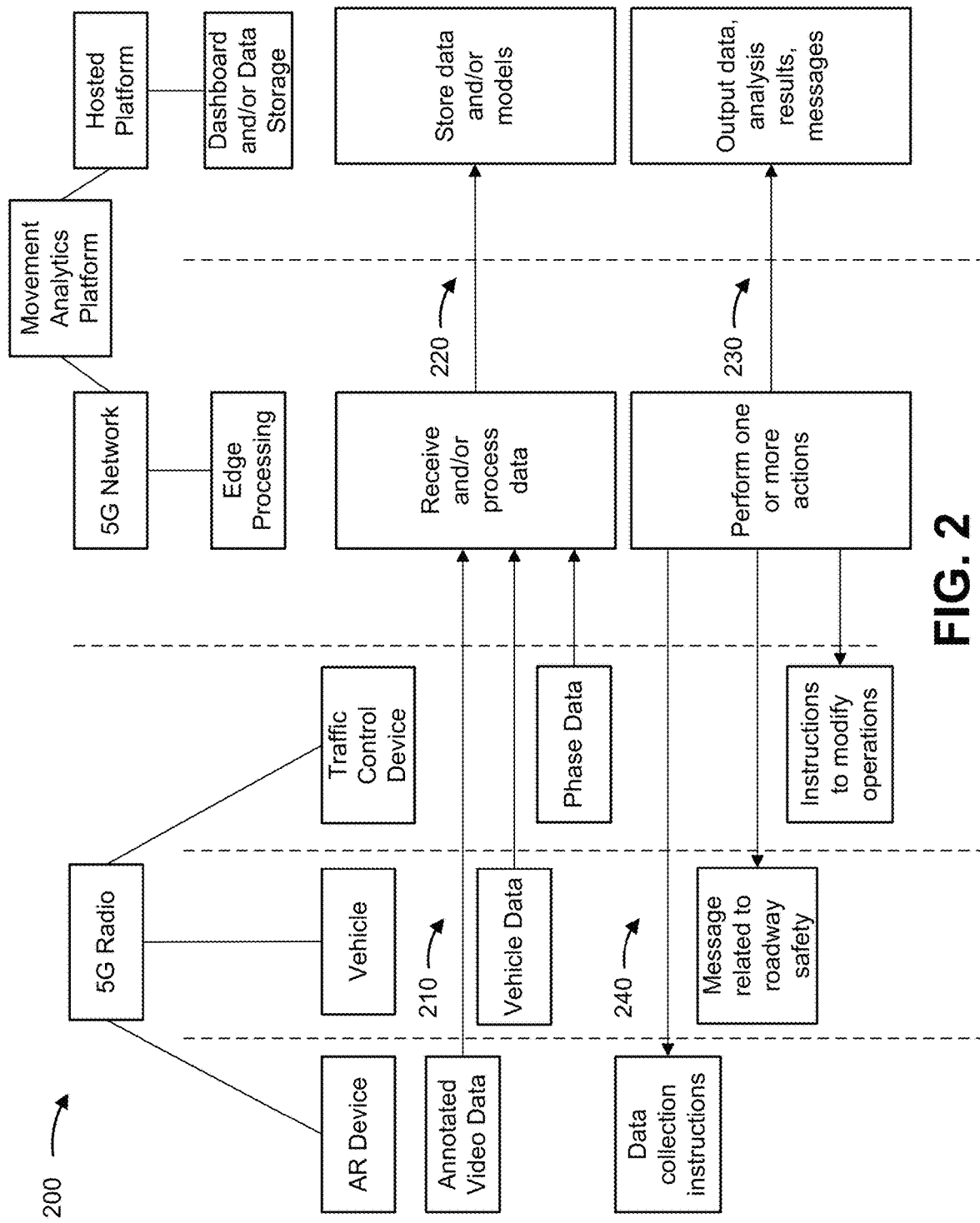

The following detailed description of example implementations refers to the accompanying drawings. The same reference numbers in different drawings can identify the same or similar elements.

Street movement information, including interactions among travelers, vehicles, and infrastructure, is often collected to help with planning, designing, operating, and/or monitoring roadways and surrounding facilities based on traffic flow, density, velocity, and/or the like. For example, street movement information can be collected to obtain data that can justify and/or inform decision-making processes aimed at implementing changes to improve traffic flow, safety, and/or the like, and to subsequently evaluate whether the changes were effective. Traditionally, collecting data relating to street movements was accomplished manually using people to visually observe and record traffic counts and related street movement information on a handheld electronic device or tally sheet. Other conventional methods to collect street movement information can include placing electronic devices (e.g., pneumatic tubes, inductive loop detectors, magnetometers, and/or the like) in an area to be monitored, and storing count and/or classification data in memory until the data is downloaded and viewed.

More recently, computer vision has been used to obtain additional details relating to traffic counts, speeds, travel directions, anomalies, and/or the like through substantially continuous data collection. In particular, data collection methods using computer vision typically rely on video feeds from traffic cameras that are hard-mounted to a fixture (e.g., a traffic control signal, a light pole, a utility pole, and/or the like) and pointed towards a roadway, intersection, and/or the like. In general, the video feeds can be processed (e.g., locally at the traffic cameras, at a central data center, and/or the like) using video analytics to detect or classify objects (e.g., people, cars, buses, bicycles, and/or the like), determine locations of the objects, characterize motion of the objects (e.g., whether the objects are stationary or in motion, a speed at which the objects are moving, a direction in which the objects are moving, and/or the like), and/or the like.

These conventional data collection methods have various drawbacks, including that using people to manually collect traffic counts, classifications, and/or the like can be inaccurate or limited due to human error, fatigue, and/or the like. Furthermore, using electronic devices (including traffic cameras) at fixed locations limits data collection to the movements that occur at or near the fixed locations. Even when traffic cameras are remotely controllable in order to focus on a particular area that might not be in the usual field of view of the traffic camera(s), the fact that traffic cameras are usually hard-mounted to immovable fixtures means that the traffic cameras lack the ability to move about freely in space and therefore cannot compensate for potential obstructions (e.g., trees, traffic poles, double-parked cars, and/or other objects that might be obscuring circumstances of interest at the monitored site). Furthermore, installing traffic cameras and other electronic devices tends to dedicate substantial costs to particular locations, including a need to connect the traffic cameras and other electronic devices to one another and/or to remote monitoring equipment (e.g., via optical fibers that are buried alongside or under the road), deliver power to the devices, and/or the like. The traffic cameras and other electronic devices are also often used to collect data in a substantially continuous manner, meaning that substantial computing resources (e.g., processing resources, storage resources, communication resources, and/or the like) can be wasted collecting data at times when there might not be any activity of interest occurring and/or when activity of interest is occurring in an area that is outside the field of view of the traffic camera.

Some implementations described herein can utilize a device having augmented reality capabilities (which can be referred to hereinafter as an "augmented reality device") to collect information that can be used to derive movement analytics associated with a site of interest (e.g., a roadway, an intersection, and/or the like). For example, augmented reality (sometimes referred to as "mixed reality" or "hybrid reality") generally refers to interactive technologies in which objects in a real-world environment are enhanced using computer-generated digital content that can be overlaid on the real-world environment, anchored to the real-world environment to produce a visual environment in which real physical objects and virtual digital objects can co-exist, and/or the like. Accordingly, in some implementations, an operator of the augmented reality device can be positioned at a suitable vantage point to observe a site of interest or a particular area at the site of interest. The augmented reality device can receive instructions for collecting video data from the site of interest, which can be rendered on a display of the augmented reality device to guide the operator through the data collection process in real-time. A movement analytics platform can receive a data feed from the augmented reality device, which can include video data corresponding to the area observed by the operator and contextual data that the operator inputs to annotate the video data. The data feed can be processed to derive movement analytics such as classifications, locations, speeds, travel directions, and/or the like for objects that are depicted in the video data. Furthermore, the movement analytics platform can generate, and provide the augmented reality device with, additional augmented reality content based on the movement analytics (e.g., an overlay related to the objects depicted in the video data, feedback related to the data collection process, and/or the like).

In this way, by utilizing a camera of the augmented reality device to collect the video data from the site of interest, the camera can move about freely in three-dimensional space, which can provide flexibility to avoid obscuring objects such as traffic poles, trees, and/or the like. Furthermore, using the augmented reality device allows for collaborative benefits of adding human insights to video analytics that could not be obtained through computer vision alone. Further still, augmented reality devices such as smartphones, optical see-through head-mounted displays, and/or the like can obtain high-quality video at a substantially smaller cost relative to hard-mounted traffic cameras (e.g., with respect to installation costs, maintenance costs, and/or the like), and augmented reality devices can be flexibly deployed at certain locations and/or times of interest. This can also conserve various computing resources (e.g., processing resources, storage resources, communication resources, and/or the like) that would otherwise be wasted collecting video data in which locations of interest are outside the field of view of a traffic camera, during times when events of interest are not occurring, and/or the like.

FIGS. 1A-1C are diagrams of one or more example implementations 100 described herein. As will be described in further detail herein, example implementation(s) 100 can include a movement analytics platform in communication with an augmented reality device to collect video data, human insights, and/or the like relating to movements at a site of interest. As shown in FIG. 1A, the movement analytics platform can generate an operator data collection workflow, which can be rendered by the augmented reality device to provide an operator of the augmented reality device with instructions regarding how to go about collecting the appropriate data from the site of interest. As shown in FIG. 1B, the movement analytics platform can receive, from the augmented reality device, a data feed that includes video data captured using a camera of the augmented reality device and contextual data input by the operator of the augmented reality device to annotate the video data with one or more observations at the site of interest. As shown in FIG. 1C, the movement analytics platform can perform one or more actions based on processing the data feed (e.g., providing feedback to the operator of the augmented reality device regarding the data collection workflow, storing the movement analytics for subsequent processing, archiving, visualization, and/or the like, communicating with one or more client devices based on the movement analytics, and/or the like).

As shown in FIG. 1A, and by reference number 105, the movement analytics platform can generate an operator data collection workflow that relates to certain locations, circumstances, objects, interactions, and/or the like to be observed at the site of interest (e.g., an intersection in the illustrated example). In particular, the operator data collection workflow can include instructions to view the intersection or a particular part of the intersection, an amount of time that the intersection or the particular part of the intersection is to be observed, certain circumstances to be observed, and/or the like. For example, the operator data collection workflow can include instructions to view the intersection for one hour while traffic or pedestrians are present and to input information relating to any weather changes that occur during the hour. In some implementations, the data collection workflow can include a sequence of instructions regarding different locations, circumstances, and/or the like to be observed at the site of interest.

As further shown in FIG. 1A, and by reference number 110, the movement analytics platform can provide, to the augmented reality device, one or more instructions based on the operator data collection workflow. In some implementations, the instructions can be formatted as augmented reality content to be rendered or otherwise displayed by the augmented reality device. For example, the augmented reality content can include a digital object, a billboard, an overlay, and/or the like, which can provide the operator of the augmented reality device with instructions regarding where to point a camera of the augmented reality device.

As further shown in FIG. 1A, and by reference number 115, the augmented reality device can display the data collection instructions using augmented reality. In particular, the augmented reality device can display the data collection instructions on a display device in combination with image data corresponding to a field of view of the camera. Accordingly, the augmented reality content can instruct the operator to point the camera in a certain direction, at certain events or circumstances of interest, and/or the like.

As shown in FIG. 1B, and by reference number 120, the augmented reality device can be used to capture and pre-process video data from the site of interest according to the operator data collection workflow. Notably, because the augmented reality device is operated by a person who can move about freely in three-dimensional space, the operator can move around the site of interest to find a suitable vantage point to observe the location(s) of interest, circumstance(s) of interest, and/or the like. Furthermore, in some cases, the user might determine that there are certain circumstances that should be observed based on human insights (e.g., if the user sees double-parked cars in his/her peripheral vision, the user can point the camera at the double-parked cars for as long as necessary to evaluate the reason for the cars being double-parked, observe whether and/or how people walk around the cars and into the street, observe how many buses the cars are blocking where the cars are double-parked in a bus lane, and/or the like). Accordingly, in some implementations, the video data captured by the augmented reality device can be based on the instructions received from the movement analytics platform, but the user can be permitted to observe other locations, circumstances, and/or the like that might not be pre-programmed as observation targets.

In this way, by using the video capture capabilities of the augmented reality device rather than camera devices that are hard-mounted to fixtures, human intelligence can be used to find a suitable vantage point (e.g., a building or roof that overlooks the intersection) in order to find a suitable view where quality observations can be made. In addition to being able to determine the best vantage point and/or the appropriate area to point the camera, the human operator can determine how long to point the camera in a particular direction, where to move the camera, and/or the like.

In some implementations, the augmented reality device can pre-process the video data captured at the site of interest. For example, in some implementations, the augmented reality device can compress the video data to reduce an amount of data to be returned to the movement analytics platform, remove spurious noise and/or insignificant features from the video data, apply one or more filters to improve image quality, insert timestamps indicating when the video data was captured, and/or the like. Furthermore, in some implementations, the pre-processing can include associating the video data with location information based on spatial computing capabilities of the augmented reality device. For example, one aspect to deriving appropriate movement analytics from the site of interest can include registration, which refers to determining where the camera of the augmented reality device is pointing in the physical world (e.g., based on latitude-longitude for any given pixel in the image). Accordingly, the augmented reality device can have spatial computing capabilities such as simultaneous localization and mapping (SLAM) and/or the like to localize the camera of the augmented reality device in a world coordinate frame (e.g., using inside-out positional tracking).

In this way, the video data can be associated with information that can be referenced to determine precise locations, speeds, travel directions, and/or the like for one or more objects depicted in the video data, even if the objects and/or the augmented reality device are in motion. In this way, regardless of whether and/or how the user changes the vantage point of the augmented reality device (e.g., by moving the user's head if the augmented reality device is a pair of smart glasses or other head-mounted display), the camera can determine a precise location (e.g., three-dimensional coordinates) for each pixel in the video data.

As further shown in FIG. 1B, and by reference number 125, the operator can provide one or more inputs to annotate the video data using contextual data related to one or more observations at the site of interest. For example, while computer vision can be used to detect certain weather events (e.g., snow, hard rain, windy conditions), in some circumstances there could be more subtle weather events that are not detectable using computer vision (e.g., a light drizzle, a light breeze, and/or the like). Accordingly, in some implementations, the operator of the augmented reality device can provide one or more audio (e.g., voice) inputs, textual inputs, gesture-based inputs to describe various observations at the site of interest (e.g., indicating when rain starts and stops, mentioning that a delivery truck is double-parked and subsequently noting when the delivery truck leaves, and/or the like).

As further shown in FIG. 1B, and by reference number 130, the augmented reality device can provide, to the movement analytics platform, a data feed that includes the video data captured at the site of interest and any contextual data that was input to annotate the video data based on the operator's observations at the site of interest. As further shown in FIG. 1B, and by reference number 135, the movement analytics platform can process the data feed to derive various movement analytics from the video data and the contextual data. The video data can be processed, either alone or in combination with the contextual data, to classify objects depicted in the video data (e.g., mobile objects such as pedestrians, vehicles, bicycles, animals, and/or the like, static or stationary objects such as traffic control signals, pedestrian crossings, sidewalks, bus lanes, bike lanes, and/or the like). Furthermore, in some implementations, the video data can be processed, either alone or in combination with the contextual data, to determine locations, speeds, travel directions, and/or the like for the depicted objects (e.g., using spatial computing or other positional tracking capabilities of the augmented reality device).

For example, the movement analytics can indicate that a particular car was at a particular latitude-longitude at a particular time in addition to measuring a speed and/or direction in which the car was traveling. In another example, the movement analytics can indicate certain interactions among objects in the captured video data. For example, determining the speed and direction in which a car and a pedestrian are travelling could be used to determine that the car entered a pedestrian crossing while the pedestrian was crossing the road. Continuing with this example, a phase of a traffic control signal (e.g., red, green, or amber) can be used to derive movement analytics indicating a general situation at the pedestrian crossing (e.g., out of one hundred cars that turned right at the intersection during the hour in which the intersection was observed, five cars turned while a pedestrian was present). In this way, the movement analytics can indicate potential locations where there might be safety issues.

In some implementations, to derive the movement analytics, the movement analytics platform can use an image processing technique to determine a pixel area of an object, to detect an object in the video data, and/or the like. For example, the movement analytics platform can use a computer vision technique, a feature detection technique, a three-dimensional (3D) object detection technique, and/or the like to detect an object in the video data, a pixel area of the object, and/or the like. In some implementations, the movement analytics platform can use a machine learning model to determine the pixel area of objects shown in the video data, to identify objects shown in the video data, and/or the like. For example, the machine learning model can have been trained on a training set of data that includes video data and information that identifies objects shown in the video data, a location of the objects within frames of the video data, and/or the like. In this way, the movement analytics platform can use one or more processing techniques to map objects shown in an image to a real-world topology for classifying objects, characterizing motion of objects, detecting interactions among objects, and/or the like.

In some implementations, the movement analytics platform can classify particular objects depicted in the video data based on pixel areas for the particular objects. For example, the movement analytics platform can determine a pixel area for an object shown in the video data, and can determine that the pixel area matches a predicted pixel area for a particular type of object. Continuing with the previous example, the movement analytics platform can determine that the video data shows a vehicle and a pedestrian based on a first pixel area for a first object shown in the video data matching a predicted pixel area for a vehicle and a second pixel area for a second object shown in the video data matching a predicted pixel area for a person.

In some implementations, the movement analytics platform can adjust a classification of one or more objects in the video data based on metadata associated with the video data (e.g., the contextual data provided by the operator to annotate the video data, an angle of a field of view of the camera, a distance of the camera from a location in the field of view of the camera, and/or the like). Continuing with the previous example, the movement analytics platform can determine the predicted pixel areas using a data structure that identifies different predicted pixel areas for different objects based on different metadata, by processing the metadata using a machine learning model, and/or the like. In some implementations, the movement analytics platform can utilize one or more natural language processing techniques to interpret the contextual data input by the operator of the augmented reality device. For example, the natural language processing techniques can include grammar induction to describe a language syntax, lemmatization to remove inflectional endings from voice data, morphological segmentation to separate words into individual morphemes or phonemes, natural language understanding to derive semantic meaning, and/or the like. In this way, the movement analytics platform can determine a relevance of the contextual data input by the operator with respect to the objects, interactions, circumstances, and/or the like depicted in the video data.

As shown in FIG. 1C, and by reference number 140, the movement analytics platform can perform one or more actions based on the movement analytics derived from the processed data feed. For example, as further shown in FIG. 1C, and by reference number 145, the movement analytics platform can provide the augmented reality device with additional augmented reality content based on the movement analytics. For example, the additional augmented reality content can include overlay, billboards, and/or other digital content that the augmented reality device can combine with one or more objects depicted in a feed received via the camera (e.g., a digital object anchored to a vehicle to draw attention to the vehicle). Additionally, or alternatively, the additional augmented reality content can include feedback relating to the data collection workflow, which can include warnings regarding obscured areas such as sidewalks, vehicle traffic lanes, and/or the like, details relating to an area or circumstance to be observed (e.g., an amount of time remaining to collect right turn data), and/or the like.

For example, based on the data feed from the augmented reality device, the movement analytics platform can generate feedback instructing the operator to turn his/her head to view a particular area (e.g., augmented reality content can instruct the operator to look at one side of the intersection when the light is green, to look at a different area when the light is red, to look at double-parked cars until the double-parked cars move, and/or the like). In another example, when sufficient video data and/or contextual data has been captured for a particular area or circumstance, the additional augmented reality content can provide the operator with a next area or circumstance to be observed. In still another example, the augmented reality content can include feedback to suggest a change in position or vantage point (e.g., move a few feet to the right, to the north, and/or the like to get a better view of an obscured area). In this way, the augmented reality content relating to the data collection workflow can give the operator of the augmented reality device step-by-step instructions and training on how to get the best view to achieve the goal of the data collection process (e.g., to understand street movements).

In some implementations, the one or more actions performed by the movement analytics platform can include sending one or more messages to one or more devices at the site of interest. For example, a message can be sent to a vehicle (e.g., an autonomous vehicle, a connected vehicle, and/or the like) to provide information related to the roadway (e.g., warning the vehicle that a traffic control signal is out at a particular intersection, warning the vehicle that collisions frequently occur at the intersection, recommending that the vehicle avoid a particular parking space because delivery trucks often double-park in that location, and/or the like). In other examples, messages can be sent to user devices to provide information relating to the roadway, to traffic control devices to modify operations of the traffic control devices (e.g., expanding a duration of a pedestrian walk signal based on frequent near-misses), and/or the like.

In some implementations, the one or more actions performed by the movement analytics platform can include storing the movement analytics, the video data, the contextual data, and/or the like to optimize subsequent data collection processes, to enable various visualizations, queries, and/or the like based on the movement analytics, the video data, the contextual data, and/or the like. For example, in some implementations, the movement analytics platform can provide a user interface accessible to a client device, such as a client device associated with a city planner that uses the movement analytics, the video data, the contextual data, and/or the like to implement one or more changes to an infrastructure design based on traffic movements, patterns, near-misses, and/or the like. Furthermore, augmented reality devices can be used to perform subsequent data collection processes to evaluate city planning efforts (e.g., whether certain changes improved traffic flow, had no effect, made traffic worse, and/or the like). For example, after one or more changes to the infrastructure design have been made at the site of interest (e.g., expanding the time for a pedestrian to cross an intersection, putting a bump-out at a curb to prevent double-parking), subsequent operator data collection workflows can be generated to focus on taking readings to evaluate the changes (e.g., a first data collection can be performed as a baseline, and subsequent data collections can be performed after changes are implemented to assess impact of the changes, to collect data periodically (e.g., every month, every few months), and/or the like). Furthermore, because the video data corresponding to the original collection process was recorded and archived by the movement analytics platform, earlier recordings can be referenced to improve efficiencies for subsequent data collection workflows (e.g., by providing instructions that avoid capturing video data from locations that did not yield useful data during the original data collection).

As indicated above, FIGS. 1A-1C are provided as one or more examples. Other examples can differ from what is described with regard to FIGS. 1A-1C. For example, although FIGS. 1A-1C illustrate a movement analytics platform that can process various types of data and/or perform various tasks to collect movement analytics from a site of interest using a device having augmented reality capabilities, in some implementations, the movement analytics platform can be distributed among multiple components that process various types of data and/or perform various tasks. For example, an edge device (e.g., a server device) can be deployed at an edge of a network (e.g., geographically close to the site of interest, as part of the movement analytics platform or separate from the movement analytics platform) to perform processing, described herein, of one or more of the various types of data. Additionally, or alternatively, the augmented reality device can perform processing, described herein, of one or more of the various types of data. In these cases, the edge device and the augmented reality device, when used to process data, can provide a result of the processing to one or more centrally located components of the movement analytics platform (e.g., in a cloud computing environment, central data center, and/or the like) for further processing, for analysis, and/or the like, can provide a result to a client device (e.g., a vehicle, a traffic control device, a user device, and/or the like), and/or the like.

In some implementations, processing by the edge device that is located geographically close to the site of interest (rather than the augmented reality device or the centrally located component(s) of the movement analytics platform) can reduce power (e.g., battery) needs of the augmented reality device and/or conserve bandwidth between the edge device and the centrally located component(s) of the movement analytics platform. In some implementations, a 5G network (or another network protocol) can connect the edge device with the augmented reality device, the centrally located component(s) of the movement analytics platform, and/or other objects such as vehicles, traffic control devices, user devices, and/or the like to reduce a latency of data communications, to conserve bandwidth, and/or the like. Furthermore, in some implementations, the edge device can connect to the centrally located component(s) of the movement analytics platform via a backhaul connection. In some implementations, processing by the augmented reality device (e.g., rather than the edge device or the centrally located component(s) of the movement analytics platform) can conserve bandwidth between the augmented reality device and the centrally located component(s) of the movement analytics platform or between the augmented reality device and the edge device, can reduce latency associated with providing data to the centrally located component(s) of the movement analytics platform and/or the edge device for processing, can facilitate faster processing (and real-time or near real-time performance of actions), and/or the like.

In this way, by moving the processing to derive video analytics, movement analytics, and/or the like from the augmented reality device to the edge device, the centrally located component(s) of the movement analytics platform, and/or the like, various computing resources can be conserved because the augmented reality device can consume less processing power, compute capabilities of the augmented reality device are offloaded to the edge device and/or the centrally located component(s) of the movement analytics platform, and/or the like. In this way, the augmented reality device can potentially be a relatively resource-constrained device, as the edge device and/or the centrally located component(s) of the movement analytics platform have sufficient computational resources to handle the video and/or movement analytics processing.

Furthermore, by moving various processing functions to the edge device and/or the centrally located component(s) of the movement analytics platform, the processing performed to derive the video and/or movement analytics can be informed by processing done on video data, contextual data, and/or the like captured from other devices (e.g., other augmented reality devices). For example, multiple users carrying respective augmented reality devices can be given instructions (e.g., for display via the augmented reality devices) to collect video data and/or contextual data related to observations at respective sites of interest in a similar manner as described in further detail elsewhere herein. Accordingly, the multiple augmented reality devices can be used to collect video data and/or contextual data that covers a larger area than any individual site of interest. Furthermore, because the multiple augmented reality devices share a common and accurate understanding of time (e.g., based on a synchronized clock), object paths, phases of traffic control signals, and/or other suitable movement analytics can be determined based on video data and/or contextual data aggregated from the multiple augmented reality devices. Accordingly, in some implementations, multiple augmented reality devices can be deployed to collaboratively collect video data and/or contextual data at different sites of interest (e.g., sites that are adjacent, overlapping, connected by a road, and/or the like), with various processing functions moved to the edge device and/or the centrally located component(s) of the movement analytics platform to derive movement analytics based on video data and/or contextual data aggregated from the multiple augmented reality devices (e.g., to understand how a vehicle running a red light at a particular intersection impacts pedestrians, traffic flow, and/or the like in a surrounding area).

Furthermore, in some implementations, certain functions performed by the edge device can be performed by the augmented reality device to avoid sending substantial amounts of video data over a network. For example, video data can stay local to the augmented reality device and/or the edge device, and data communicated back to the centrally located component(s) of the movement analytics platform can be limited to the derived analytics (e.g., as metadata representing salient points to enable visualizations, archiving, derivation of operator instructions, and/or the like), which can conserve various computing resources (e.g., bandwidth, processing resources, storage resources, and/or the like) due to a substantial reduction in data volume communicated to the centrally located component(s) of the movement analytics platform.

FIG. 2 is a diagram of an example implementation 200 described herein. As shown in FIG. 2, implementation 200 includes a 5G radio (e.g., a 5G base station), and a movement analytics platform partially deployed on a 5G network and partially deployed as a hosted platform (e.g., on a user device, on a server device, and/or the like).

As shown by reference number 210, various devices, such as an augmented reality device, a vehicle, a traffic control device, and/or the like, can provide data to the movement analytics platform in a manner similar to that described elsewhere herein. For example, the various devices can provide the data via a 5G radio. In some implementations, the movement analytics platform can receive the data via a 5G network and/or can perform various processing of the data on the 5G network, in a manner similar to that described elsewhere herein. In some implementations, processing described herein can be performed at an edge of a 5G network (e.g., shown as "Edge Processing" in FIG. 2). For example, a server device located at an edge of a network can be deployed between the augmented reality device and the movement analytics platform, deployed as an edge component of the movement analytics platform or separate from the movement analytics platform, and/or the like. In some implementations, as shown in FIG. 2, the server device located at the edge of the network can receive and/or process annotated video data (e.g., in a data feed that includes video data that the augmented reality device captured at a site of interest, contextual data that relates to operator observations at the site of interest, and/or the like), vehicle data (e.g., location data, motion data indicating a travel direction and/or speed, and/or the like), traffic control phase data (e.g., whether a traffic control signal is red, green, or amber, whether a pedestrian signal is in a walk phase or a don't walk phase), user device data (e.g., location data, motion data, sensor data, and/or the like) in a manner that is the same as or similar to that described elsewhere herein. Additionally, or alternatively, processing described herein can be performed by the augmented reality device, or another device, located at a roadway, which can provide a result of the processing to the movement analytics platform, to an edge device, and/or the like for further processing, for analysis, and/or the like.

As shown by reference number 220, the movement analytics platform can store data and/or models described herein in a server device associated with a hosted portion of the movement analytics platform. In some implementations, the movement analytics platform can perform one or more actions similar to that described elsewhere herein. For example, and as shown by reference number 230, the movement analytics platform can output data, analysis results, messages, and/or the like via a dashboard or other user interface. Additionally, or alternatively, and as additional examples shown by reference number 240, the movement analytics platform can send a message to the augmented reality device that includes instructions for collecting video data from a site of interest, augmented reality content relating to movement analytics derived by the movement analytics platform, and/or the like. Furthermore, as shown in FIG. 2, the movement analytics platform can send a message to the vehicle that relates to roadway safety, can send instructions to the traffic control device to modify operations of the traffic control device (e.g., to modify a duration of a pedestrian walk phase), and/or the like.

As indicated above, FIG. 2 is provided merely as an example. Other examples can differ from what is described with regard to FIG. 2.

Figure 3:
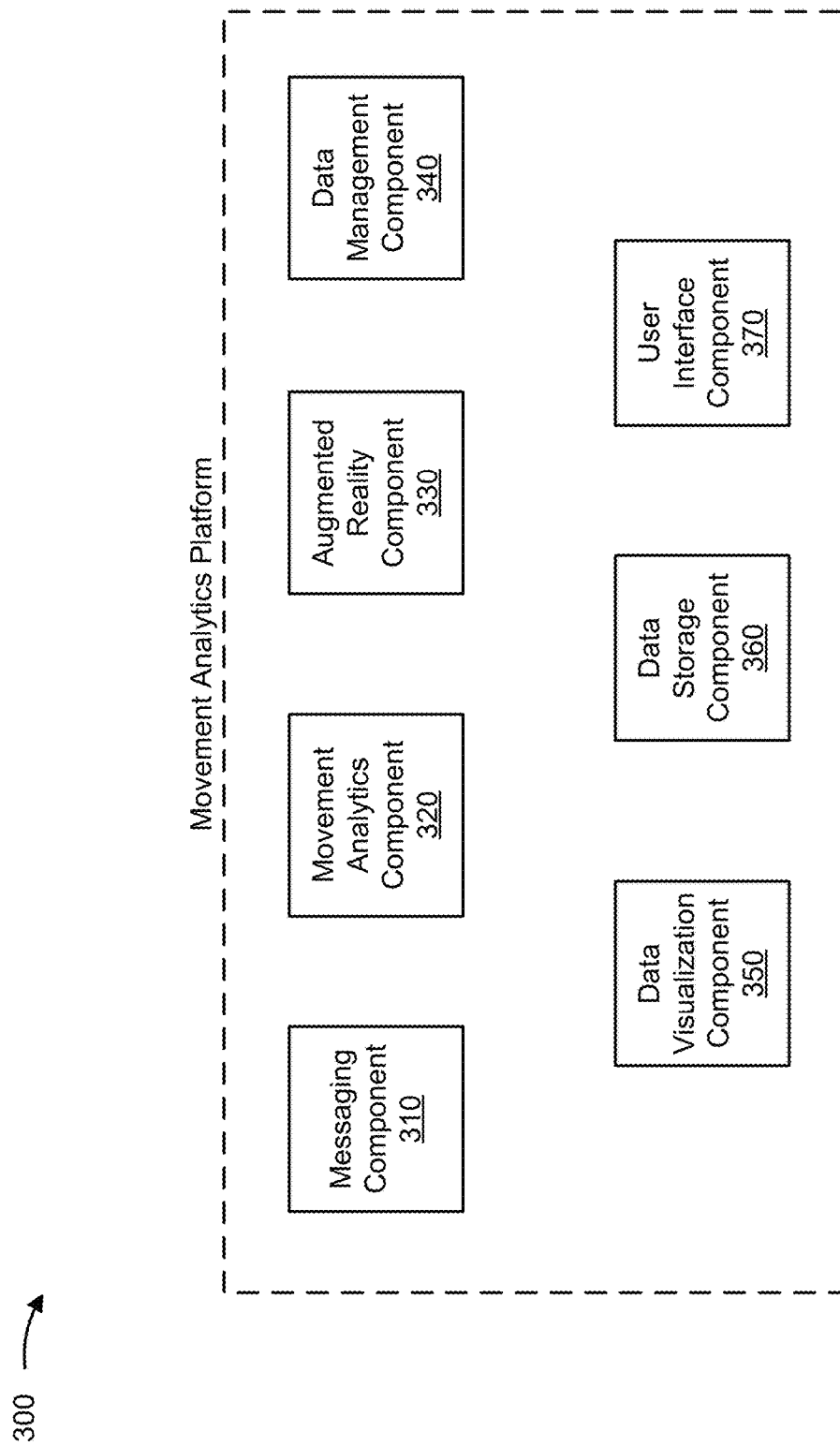

FIG. 3 is a diagram of an example implementation 300 described herein. FIG. 3 shows example components of a movement analytics platform.

As shown in FIG. 3, the movement analytics platform can include a messaging component 310. For example, the movement analytics platform can use the messaging component 310 to send and/or receive a message, a set of instructions, and/or the like in a manner similar to that described elsewhere herein.

As further shown in FIG. 3, the movement analytics platform can include a movement analytics component 320. For example, the movement analytics platform can use the movement analytics component 320 to classify an object depicted in video data captured at a site of interest (e.g., whether the object is a person, a car, a bicycle, a motorcycle, a bus, and/or the like), to determine a location, speed, travel direction, and/or the like with respect to the object, and/or the like in a manner similar to that described elsewhere herein.

As further shown in FIG. 3, the movement analytics platform can include an augmented reality component 330. For example, the movement analytics platform can use the augmented reality component 330 to generate digital content providing instructions and/or feedback for collecting video data from a site of interest, digital content related to movement analytics derived from the video data, to determine locations of objects depicted in the video data based on positional tracking capabilities of the augmented reality device, and/or the like in a manner similar to that described elsewhere herein.

As further shown in FIG. 3, the movement analytics platform can include a data management component 340. For example, the movement analytics platform can use the data management component 340 to receive, store, modify, access, and/or otherwise process data in a manner similar to that described elsewhere herein. As further shown in FIG. 3, the movement analytics platform can include a data visualization component 350. For example, the movement analytics platform can use the data visualization component 350 to provide data for display, to populate a user interface with data, to generate charts, graphs, and/or the like from data, and/or the like. As further shown in FIG. 3, the movement analytics platform can include a data storage component 360. For example, the data storage component 360 can include one or more data structures used to store data, results of analyses, and/or the like. As further shown in FIG. 3, the movement analytics platform can include a user interface component 370. For example, the movement analytics platform can use the user interface component 370 to provide a set of user interfaces for display to a user of the movement analytics platform (e.g., via a client device).

As indicated above, FIG. 3 is provided merely as an example. Other examples can differ from what is described with regard to FIG. 3. The number and arrangement of components shown in FIG. 3 are provided as an example. In practice, the movement analytics platform can include additional components, fewer components, different components, or differently arranged components than those shown in FIG. 3. Additionally, or alternatively, a set of components (e.g., one or more components) of the movement analytics platform can perform one or more functions described as being performed by another set of components of the movement analytics platform.

Figure 4:
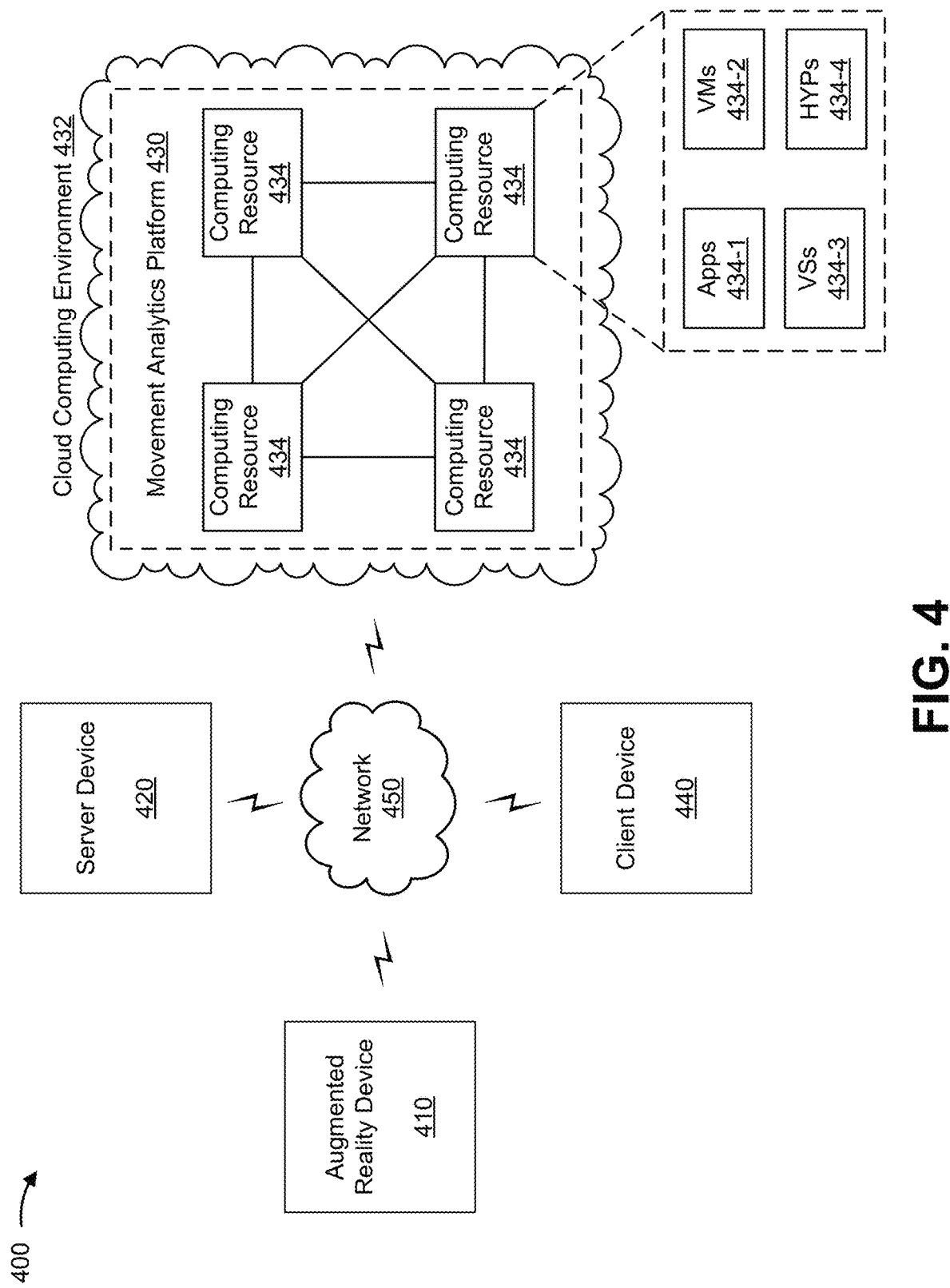
FIG. 4 is a diagram of an example environment in which systems and/or methods described herein can be implemented.

FIG. 4 is a diagram of an example environment 400 in which systems and/or methods described herein can be implemented. As shown in FIG. 4, environment 400 can include an augmented reality device 410, a server device 420, a movement analytics platform 430 hosted within a cloud computing environment 432 that includes a set of computing resources 434, a client device 440, and a network 450. Devices of environment 400 can interconnect via wired connections, wireless connections, or a combination of wired and wireless connections.

Augmented reality device 410 includes one or more devices capable of receiving, generating, storing, processing, displaying, and/or providing information associated with video data collected from a site that includes at least one roadway, as described elsewhere herein. For example, augmented reality device 410 can be any suitable device having augmented reality and/or mixed reality capabilities (e.g., capabilities to render digital content in combination with real-world images), such as an optical see-through display device, a video see-through display device, a holographic display device, a heads-up display device, a smartphone, a tablet computer, a handheld computer, and/or the like. Augmented reality device 410 includes a camera that can capture video data, image data, and/or the like. For example, the camera can include a video camera, a still image camera, an infrared camera, and/or the like. Augmented reality device 410 further includes one or more display devices capable of rendering digital content in combination with the video data, the image data, and/or the like captured using the camera. For example, in some implementations, the one or more display devices can include a liquid crystal display (LCD) device, a light-emitting diode (LED) display device, a plasma display device, a wearable display device (e.g., a head-mounted display device), a handheld display device, a stereoscopic or three-dimensional display device, and/or the like. In some implementations, augmented reality device 410 can use the one or more display devices to display instructions for capturing video data corresponding to a particular area, capture the video data using the camera, and provide the video data to movement analytics platform 430, as described elsewhere herein. In some implementations, augmented reality device 410 can process video data in a manner that is the same as or similar to that described elsewhere herein, and can provide a result of processing the video data to movement analytics platform 430, to server device 420 (e.g., at an edge of network 450) for further processing, for analysis, and/or the like, as described elsewhere herein.

Server device 420 includes one or more devices capable of receiving, generating storing, processing, and/or providing information associated with movement analytics at a site of interest. For example, server device 420 can include a server (e.g., in a data center or a cloud computing environment), a data center (e.g., a multi-server micro datacenter), a workstation computer, a virtual machine (VM) provided in a cloud computing environment, or a similar type of device. In some implementations, server device 420 can include a communication interface that allows server device 420 to receive information from and/or transmit information to other devices in environment 400. In some implementations, server device 420 can be a physical device implemented within a housing, such as a chassis. In some implementations, server device 420 can be a virtual device implemented by one or more computer devices of a cloud computing environment or a data center. In some implementations, server device 420 can store and/or process a data feed including video data collected at a site of interest using augmented reality device 410 and/or contextual data relating to one or more observations by a user operating augmented reality device 410, as described elsewhere herein. For example, as described elsewhere herein, server device 420 can be an edge device located at an edge of network 450 between a device used to collect video data at a site of interest (e.g., augmented reality device 410) and movement analytics platform 430, and can process data in a manner that is the same as or similar to that described elsewhere herein.

Movement analytics platform 430 includes one or more devices capable of receiving, generating, storing, processing, and/or providing information associated with movement analytics at a site of interest. For example, movement analytics platform 430 can generate instructions for collecting video data from a site that includes at least one roadway and provide the one or more instructions for display by augmented reality device 410 (e.g., to indicate a particular area at the site that an operator of augmented reality device 410 is to position within a field of view of a camera of augmented reality device 410). In some implementations, movement analytics platform 430 can receive, generate, store, and/or otherwise process information related to a data feed from augmented reality device 410 that includes video data corresponding to the particular area and contextual data to annotate the video data based on one or more observations by the operator of augmented reality device 410. For example, movement analytics platform 430 can process the data feed to derive movement analytics associated with the particular area at the site (e.g., determining a classification, a location, a speed, a travel direction, and/or the like for one or more objects depicted in the video data) and generate, based on the movement analytics, additional augmented reality content to be displayed by augmented reality device 410 (e.g., an overlay related to the one or more objects depicted in the video data, feedback and/or further instructions for collecting the video data from the site, and/or the like).

In some implementations, as shown, movement analytics platform 430 can be hosted in a cloud computing environment 432. Notably, while implementations described herein describe movement analytics platform 430 as being hosted in cloud computing environment 432, in some implementations, movement analytics platform 430 can be non-cloud-based (i.e., can be implemented outside of a cloud computing environment) or partially cloud-based.

Cloud computing environment 432 includes an environment that hosts movement analytics platform 430. Cloud computing environment 432 can provide computation, software, data access, storage, etc. services that do not require end-user knowledge of a physical location and configuration of system(s) and/or device(s) that host movement analytics platform 430. As shown, cloud computing environment 432 can include a group of computing resources 434 (referred to collectively as "computing resources 434" and individually as "computing resource 434").

Computing resource 434 includes one or more personal computers, workstation computers, server devices, or other types of computation and/or communication devices. In some implementations, computing resource 434 can host movement analytics platform 430. The cloud resources can include compute instances executing in computing resource 434, storage devices provided in computing resource 434, data transfer devices provided by computing resource 434, and/or the like. In some implementations, computing resource 434 can communicate with other computing resources 434 via wired connections, wireless connections, or a combination of wired and wireless connections.

As further shown in FIG. 4, computing resource 434 includes a group of cloud resources, such as one or more applications ("APPs") 434-1, one or more virtual machines ("VMs") 434-2, virtualized storage ("VSs") 434-3, one or more hypervisors ("HYPs") 434-4, and/or the like.

Application 434-1 includes one or more software applications that can be provided to or accessed by augmented reality device 410, server device 420, client device 440, and/or the like. Application 434-1 can eliminate a need to install and execute the software applications on augmented reality device 410, server device 420, client device 440, and/or the like. For example, application 434-1 can include software associated with movement analytics platform 430 and/or any other software capable of being provided via cloud computing environment 432. In some implementations, one application 434-1 can send/receive information to/from one or more other applications 434-1, via virtual machine 434-2.

Virtual machine 434-2 includes a software implementation of a machine (e.g., a computer) that executes programs like a physical machine. Virtual machine 434-2 can be either a system virtual machine or a process virtual machine, depending upon use and degree of correspondence to any real machine by virtual machine 434-2. A system virtual machine can provide a complete system platform that supports execution of a complete operating system ("OS"). A process virtual machine can execute a single program, and can support a single process. In some implementations, virtual machine 434-2 can execute on behalf of a user (e.g., a user of augmented reality device 410, server device 420, client device 440, and/or the like), and can manage infrastructure of cloud computing environment 432, such as data management, synchronization, or long-duration data transfers.

Virtualized storage 434-3 includes one or more storage systems and/or one or more devices that use virtualization techniques within the storage systems or devices of computing resource 434. In some implementations, within the context of a storage system, types of virtualizations can include block virtualization and file virtualization. Block virtualization can refer to abstraction (or separation) of logical storage from physical storage so that the storage system can be accessed without regard to physical storage or heterogeneous structure. The separation can provide administrators of the storage system with flexibility in how the administrators manage storage for end users. File virtualization can eliminate dependencies between data accessed at a file level and a location where files are physically stored. This can enable optimization of storage use, server consolidation, and/or performance of non-disruptive file migrations.

Hypervisor 434-4 can provide hardware virtualization techniques that allow multiple operating systems (e.g., "guest operating systems") to execute concurrently on a host computer, such as computing resource 434. Hypervisor 434-4 can present a virtual operating platform to the guest operating systems, and can manage the execution of the guest operating systems. Multiple instances of a variety of operating systems can share virtualized hardware resources.

Client device 440 includes one or more devices capable of receiving, generating, storing, processing, and/or providing information associated with movement analytics at a site of interest. For example, client device 440 can include a user device such as a mobile phone (e.g., a smart phone, a radiotelephone, etc.), a laptop computer, a tablet computer, a handheld computer, a gaming device, a wearable communication device (e.g., a smart wristwatch, a pair of smart eyeglasses, etc.), a desktop computer, or a similar type of device. Additionally, or alternatively, client device 440 can include an autonomous or non-autonomous vehicle such as a car, a truck, a motorcycle, a boat, a train, a plane, a drone, and/or the like with one or more devices capable of communicating with movement analytics platform 430, modifying operations of the vehicle, and/or the like. Additionally, or alternatively, client device 440 can include a traffic control device such as a traffic control signal, a pedestrian control signal, and/or the like.

Network 450 includes one or more wired and/or wireless networks. For example, network 450 can include a cellular network (e.g., a long-term evolution (LTE) network, a code division multiple access (CDMA) network, a 3G network, a 4G network, a 5G network, another type of next generation network, etc.), a public land mobile network (PLMN), a local area network (LAN), a wide area network (WAN), a metropolitan area network (MAN), a telephone network (e.g., the Public Switched Telephone Network (PSTN)), a private network, an ad hoc network, an intranet, the internet, a fiber optic-based network, a cloud computing network, a mesh network and/or the like, and/or a combination of these or other types of networks.

The number and arrangement of devices and networks shown in FIG. 4 are provided as one or more examples. In practice, there can be additional devices and/or networks, fewer devices and/or networks, different devices and/or networks, or differently arranged devices and/or networks than those shown in FIG. 4. Furthermore, two or more devices shown in FIG. 4 can be implemented within a single device, or a single device shown in FIG. 4 can be implemented as multiple, distributed devices. Additionally, or alternatively, a set of devices (e.g., one or more devices) of environment 400 can perform one or more functions described as being performed by another set of devices of environment 400.

Figure 5:
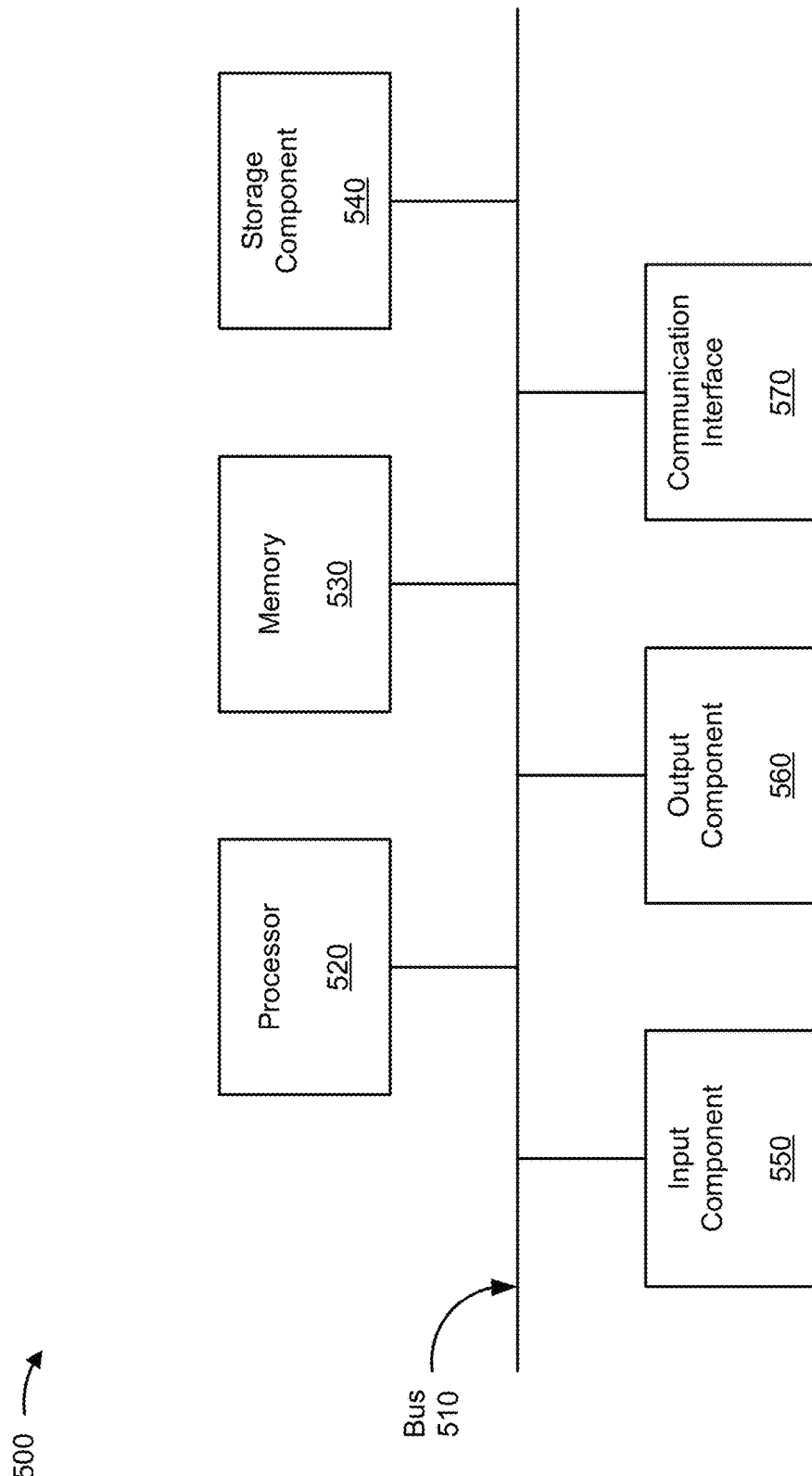
FIG. 5 is a diagram of example components of one or more devices of FIG. 4.

FIG. 5 is a diagram of example components of a device 500. Device 500 can correspond to augmented reality device 410, server device 420, movement analytics platform 430, and/or client device 440. In some implementations, augmented reality device 410, server device 420, movement analytics platform 430, and/or client device 440 can include one or more devices 500 and/or one or more components of device 500. As shown in FIG. 5, device 500 can include a bus 510, a processor 520, a memory 530, a storage component 540, an input component 550, an output component 560, and a communication interface 570.

Bus 510 includes a component that permits communication among multiple components of device 500. Processor 520 is implemented in hardware, firmware, and/or a combination of hardware and software. Processor 520 is a central processing unit (CPU), a graphics processing unit (GPU), an accelerated processing unit (APU), a microprocessor, a microcontroller, a digital signal processor (DSP), a field-programmable gate array (FPGA), an application-specific integrated circuit (ASIC), or another type of processing component. In some implementations, processor 520 includes one or more processors capable of being programmed to perform a function. Memory 530 includes a random-access memory (RAM), a read only memory (ROM), and/or another type of dynamic or static storage device (e.g., a flash memory, a magnetic memory, and/or an optical memory) that stores information and/or instructions for use by processor 520.

Storage component 540 stores information and/or software related to the operation and use of device 500. For example, storage component 540 can include a hard disk (e.g., a magnetic disk, an optical disk, and/or a magneto-optic disk), a solid-state drive (SSD), a compact disc (CD), a digital versatile disc (DVD), a floppy disk, a cartridge, a magnetic tape, and/or another type of non-transitory computer-readable medium, along with a corresponding drive.

Input component 550 includes a component that permits device 500 to receive information, such as via user input (e.g., a touch screen display, a keyboard, a keypad, a mouse, a button, a switch, and/or a microphone). Additionally, or alternatively, input component 550 can include a component for determining location (e.g., a global positioning system (GPS) component) and/or a sensor (e.g., an accelerometer, a gyroscope, an actuator, another type of positional or environmental sensor, and/or the like). Output component 560 includes a component that provides output information from device 500 (via, e.g., a display, a speaker, a haptic feedback component, an audio or visual indicator, and/or the like).

Communication interface 570 includes a transceiver-like component (e.g., a transceiver, a separate receiver, a separate transmitter, and/or the like) that enables device 500 to communicate with other devices, such as via a wired connection, a wireless connection, or a combination of wired and wireless connections. Communication interface 570 can permit device 500 to receive information from another device and/or provide information to another device. For example, communication interface 570 can include an Ethernet interface, an optical interface, a coaxial interface, an infrared interface, a radio frequency (RF) interface, a universal serial bus (USB) interface, a wireless local area network interface, a cellular network interface, and/or the like.

Device 500 can perform one or more processes described herein. Device 500 can perform these processes based on processor 520 executing software instructions stored by a non-transitory computer-readable medium, such as memory 530 and/or storage component 540. As used herein, the term "computer-readable medium" refers to a non-transitory memory device. A memory device includes memory space within a single physical storage device or memory space spread across multiple physical storage devices.

Software instructions can be read into memory 530 and/or storage component 540 from another computer-readable medium or from another device via communication interface 570. When executed, software instructions stored in memory 530 and/or storage component 540 can cause processor 520 to perform one or more processes described herein. Additionally, or alternatively, hardware circuitry can be used in place of or in combination with software instructions to perform one or more processes described herein. Thus, implementations described herein are not limited to any specific combination of hardware circuitry and software.

The number and arrangement of components shown in FIG. 5 are provided as an example. In practice, device 500 can include additional components, fewer components, different components, or differently arranged components than those shown in FIG. 5. Additionally, or alternatively, a set of components (e.g., one or more components) of device 500 can perform one or more functions described as being performed by another set of components of device 500.

Figure 6:
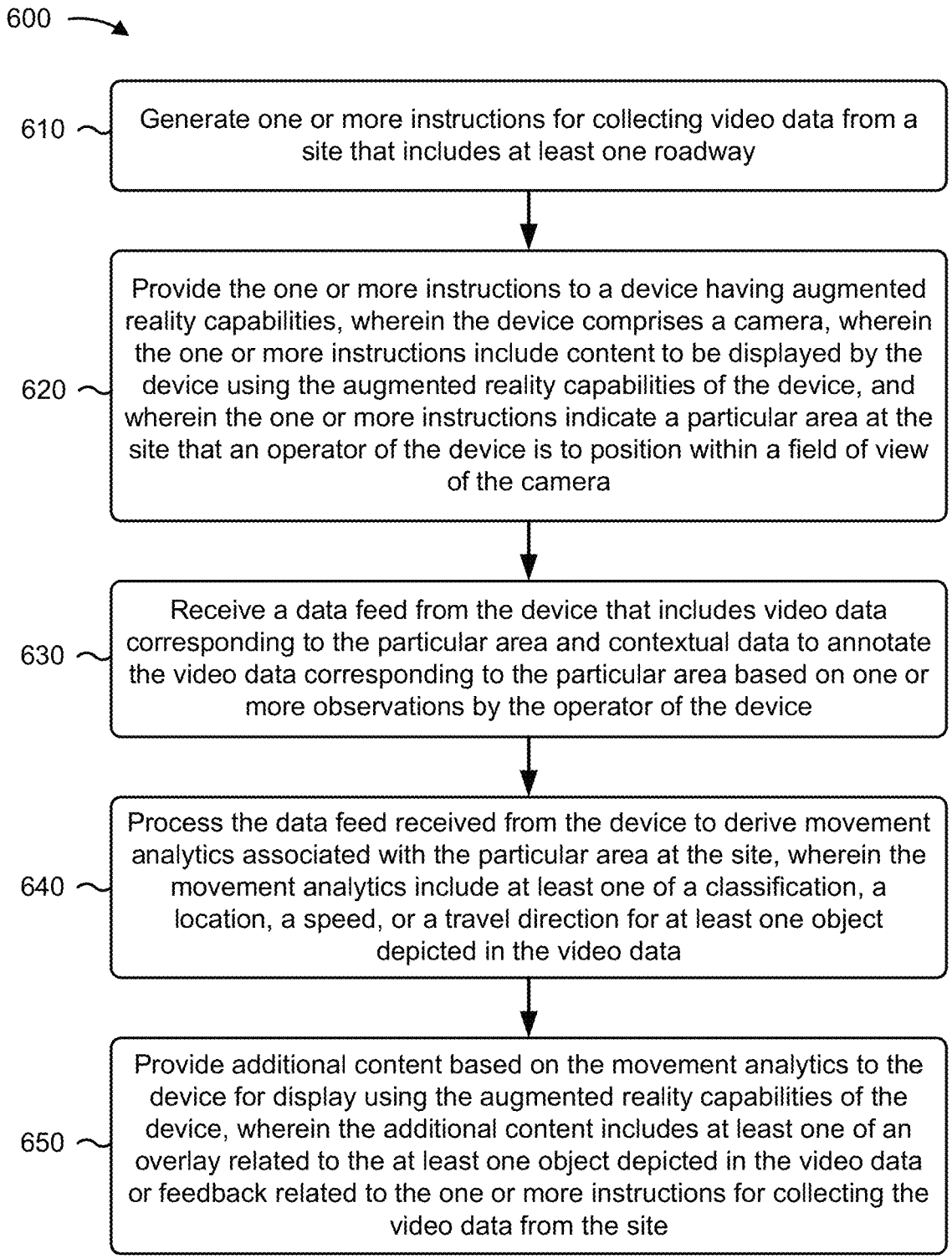
FIG. 6 is a flow chart of an example process for collecting movement analytics using augmented reality.

FIG. 6 is a flow chart of an example process 600 for collecting movement analytics using augmented reality. In some implementations, one or more process blocks of FIG. 6 can be performed by a movement analytics platform (e.g., movement analytics platform 430). In some implementations, one or more process blocks of FIG. 6 can be performed by another device or a group of devices separate from or including the movement analytics platform, such as an augmented reality device (e.g., augmented reality device 410), a server device (e.g., server device 420), a client device (e.g., client device 440), and/or the like.

As shown in FIG. 6, process 600 can include generating one or more instructions for collecting video data from a site that includes at least one roadway (block 610). For example, the movement analytics platform (e.g., using processor 520, memory 530, storage component 540, input component 550, output component 560, communication interface 570, and/or the like) can generate one or more instructions for collecting video data from a site that includes at least one roadway, as described above.

As further shown in FIG. 6, process 600 can include providing the one or more instructions to a device having augmented reality capabilities, wherein the device comprises a camera, wherein the one or more instructions include content to be displayed by the device using the augmented reality capabilities of the device, and wherein the one or more instructions indicate a particular area at the site that an operator of the device is to position within a field of view of the camera (block 620). For example, the movement analytics platform (e.g., using processor 520, memory 530, storage component 540, input component 550, output component 560, communication interface 570, and/or the like) can provide the one or more instructions to a device having augmented reality capabilities, as described above. In some implementations, the device comprises a camera. In some implementations, the one or more instructions include content to be displayed by the device using the augmented reality capabilities of the device. In some implementations, the one or more instructions indicate a particular area at the site that an operator of the device is to position within a field of view of the camera.

As further shown in FIG. 6, process 600 can include receiving a data feed from the device that includes video data corresponding to the particular area and contextual data to annotate the video data corresponding to the particular area based on one or more observations by the operator of the device (block 630). For example, the movement analytics platform (e.g., using processor 520, memory 530, storage component 540, input component 550, output component 560, communication interface 570, and/or the like) can receive a data feed from the device that includes video data corresponding to the particular area and contextual data to annotate the video data corresponding to the particular area based on one or more observations by the operator of the device, as described above.

As further shown in FIG. 6, process 600 can include processing the data feed received from the device to derive movement analytics associated with the particular area at the site, wherein the movement analytics include at least one of a classification, a location, a speed, or a travel direction for at least one object depicted in the video data (block 640). For example, the movement analytics platform (e.g., using processor 520, memory 530, storage component 540, input component 550, output component 560, communication interface 570, and/or the like) can process the data feed received from the device to derive movement analytics associated with the particular area at the site, as described above. In some implementations, the movement analytics include at least one of a classification, a location, a speed, or a travel direction for at least one object depicted in the video data.

As further shown in FIG. 6, process 600 can include providing additional content based on the movement analytics to the device for display using the augmented reality capabilities of the device, wherein the additional content includes at least one of an overlay related to the at least one object depicted in the video data or feedback related to the one or more instructions for collecting the video data from the site (block 650). For example, the movement analytics platform (e.g., using processor 520, memory 530, storage component 540, input component 550, output component 560, communication interface 570, and/or the like) can provide additional content based on the movement analytics to the device for display using the augmented reality capabilities of the device, as described above. In some implementations, the additional content includes at least one of an overlay related to the at least one object depicted in the video data or feedback related to the one or more instructions for collecting the video data from the site.

Process 600 can include additional implementations, such as any single implementation or any combination of implementations described below and/or in connection with one or more other processes described elsewhere herein.

In some implementations, the feedback related to the one or more instructions indicates a different area at the site that the operator of the device is to position within the field of view of the camera. In some implementations, the feedback related to the one or more instructions indicates a suggested change in vantage point for the operator of the device.

In some implementations, the movement analytics platform can detect, based on one or more of the movement analytics or the contextual data, a circumstance of interest relating to the at least one object. In some implementations, the overlay can indicate that the operator of the device is to focus the field of view of the camera on the at least one object based on detecting the circumstance of interest relating to the at least one object.

In some implementations, the data feed received from the device further indicates a tracked three-dimensional position for the at least one object depicted in the video data based on a registration of the at least one object that is determined using the augmented reality capabilities of the device. In some implementations, the contextual data includes one or more audio inputs, text-based inputs, or gesture-based inputs that are based on the one or more observations by the operator of the device.

In some implementations, the movement analytics platform can generate an operator workflow for subsequently collecting video data from the site based on the derived movement analytics and the contextual data based on the one or more observations by the operator of the device. In some implementations, the operator workflow can be generated to evaluate one or more changes to an infrastructure design associated with the site.

Although FIG. 6 shows example blocks of process 600, in some implementations, process 600 can include additional blocks, fewer blocks, different blocks, or differently arranged blocks than those depicted in FIG. 6. Additionally, or alternatively, two or more of the blocks of process 600 can be performed in parallel.

The foregoing disclosure provides illustration and description, but is not intended to be exhaustive or to limit the implementations to the precise form disclosed. Modifications and variations can be made in light of the above disclosure or can be acquired from practice of the implementations.

As used herein, the term "component" is intended to be broadly construed as hardware, firmware, or a combination of hardware and software.

Certain user interfaces have been described herein and/or shown in the figures. A user interface can include a graphical user interface, a non-graphical user interface, a text-based user interface, and/or the like. A user interface can provide information for display. In some implementations, a user can interact with the information, such as by providing input via an input component of a device that provides the user interface for display. In some implementations, a user interface can be configurable by a device and/or a user (e.g., a user can change the size of the user interface, information provided via the user interface, a position of information provided via the user interface, etc.). Additionally, or alternatively, a user interface can be pre-configured to a standard configuration, a specific configuration based on a type of device on which the user interface is displayed, and/or a set of configurations based on capabilities and/or specifications associated with a device on which the user interface is displayed.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

It will be apparent that systems and/or methods described herein can be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

Even though particular combinations of features are recited in the claims and/or disclosed in the specification, these combinations are not intended to limit the disclosure of various implementations. In fact, many of these features can be combined in ways not specifically recited in the claims and/or disclosed in the specification. Although each dependent claim listed below can directly depend on only one claim, the disclosure of various implementations includes each dependent claim in combination with every other claim in the claim set.

No element, act, or instruction used herein should be construed as critical or essential unless explicitly described as such. Also, as used herein, the articles "a" and "an" are intended to include one or more items, and can be used interchangeably with "one or more." Furthermore, as used herein, the term "set" is intended to include one or more items (e.g., related items, unrelated items, a combination of related and unrelated items, etc.), and can be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. A method, comprising:
   generating, by a first device, one or more instructions for collecting video data from a site that includes at least one roadway;
   providing, by the first device, the one or more instructions to a second device having augmented reality capabilities,
      wherein the second device comprises a camera,
      wherein the one or more instructions include content to be displayed by the second device using the augmented reality capabilities of the second device, and
      wherein the one or more instructions indicate a particular area at the site that an operator of the second device is to position within a field of view of the camera;
   receiving, by the first device, a data feed from the second device that includes video data corresponding to the particular area and contextual data to annotate the video data corresponding to the particular area based on one or more observations by the operator of the second device;
   processing, by the first device, the data feed received from the second device to derive movement analytics associated with the particular area at the site,
      wherein the movement analytics include at least one of a classification, a location, a speed, or a travel direction for at least one object depicted in the video data; and
   providing, by the first device, additional content based on the movement analytics to the second device for display using the augmented reality capabilities of the second device,
      wherein the additional content includes at least one of an overlay related to the at least one object depicted in the video data or feedback related to the one or more instructions for collecting the video data from the site.

2. The method of claim 1, wherein the feedback related to the one or more instructions indicates a different area at the site that the operator of the second device is to position within the field of view of the camera.

3. The method of claim 1, wherein the feedback related to the one or more instructions indicates a suggested change in vantage point for the operator of the second device.

4. The method of claim 1, further comprising:
   detecting, based on one or more of the movement analytics or the contextual data, a circumstance of interest relating to the at least one object,
      wherein the overlay indicates that the operator of the second device is to focus the field of view of the camera on the at least one object based on detecting the circumstance of interest relating to the at least one object.

5. The method of claim 1, wherein the data feed received from the second device further indicates a tracked three-dimensional position for the at least one object depicted in the video data based on a registration of the at least one object that is determined using the augmented reality capabilities of the second device.

6. The method of claim 1, wherein the contextual data includes one or more audio inputs, text-based inputs, or gesture-based inputs that are based on the one or more observations by the operator of the second device.

7. The method of claim 1, further comprising:
generating an operator workflow for subsequently collecting video data from the site based on the derived movement analytics and the contextual data based on the one or more observations by the operator of the second device,
wherein the operator workflow is generated to evaluate one or more changes to an infrastructure design associated with the site.

8. A device, comprising:
one or more memories; and
one or more processors, communicatively coupled to the one or more memories, to:
generate one or more instructions for collecting video data from a site that includes at least one roadway;
provide the one or more instructions to an augmented reality device,
wherein the augmented reality device comprises a camera,
wherein the one or more instructions include content to be displayed by the augmented reality device, and
wherein the one or more instructions indicate a particular area at the site that an operator of the augmented reality device is to position within a field of view of the camera;
receive a data feed from the augmented reality device that includes video data corresponding to the particular area and contextual data to annotate the video data corresponding to the particular area based on one or more observations by the operator of the augmented reality device;
process the data feed received from the augmented reality device to derive movement analytics associated with the particular area at the site,
wherein the movement analytics include at least one of a classification, a location, a speed, or a travel direction for at least one object depicted in the video data; and
provide additional content based on the movement analytics to the augmented reality device for display by the augmented reality device,
wherein the additional content includes at least one of an overlay related to the at least one object depicted in the video data or feedback related to the one or more instructions for collecting the video data from the site.

9. The device of claim 8, wherein the feedback related to the one or more instructions indicates a different area at the site that the operator of the augmented reality device is to position within the field of view of the camera.

10. The device of claim 8, wherein the feedback related to the one or more instructions indicates a suggested change in vantage point for the operator of the augmented reality device.

11. The device of claim 8, wherein the one or more processors are further to:
detect, based on one or more of the movement analytics or the contextual data, a circumstance of interest relating to the at least one object,
wherein the overlay indicates that the operator of the augmented reality device is to focus the field of view of the camera on the at least one object based on detecting the circumstance of interest relating to the at least one object.

12. The device of claim 8, wherein the data feed received from the augmented reality device further indicates a tracked three-dimensional position for the at least one object depicted in the video data based on a registration of the at least one object that is determined using augmented reality capabilities of the augmented reality device.

13. The device of claim 8, wherein the contextual data includes one or more audio inputs, text-based inputs, or gesture-based inputs that are based on the one or more observations by the operator of the augmented reality device.

14. The device of claim 8, wherein the one or more processors are further to:
generate an operator workflow for subsequently collecting video data from the site based on the derived movement analytics and the contextual data based on the one or more observations by the operator of the augmented reality device,
wherein the operator workflow is generated to evaluate one or more changes to an infrastructure design associated with the site.

15. A non-transitory computer-readable medium storing instructions, the instructions comprising:
one or more instructions that, when executed by one or more processors, cause the one or more processors to:
generate one or more instructions for collecting video data from a site that includes at least one roadway;
provide the one or more instructions to a device having augmented reality capabilities,
wherein the device comprises a camera,
wherein the one or more instructions include content to be displayed by the device using the augmented reality capabilities of the device, and
wherein the one or more instructions indicate a particular area at the site that an operator of the device is to position within a field of view of the camera;
receive a data feed from the device that includes video data corresponding to the particular area and contextual data to annotate the video data corresponding to the particular area based on one or more observations by the operator of the device;
process the data feed received from the device to derive movement analytics associated with the particular area at the site,
wherein the movement analytics include at least one of a classification, a location, a speed, or a travel direction for at least one object depicted in the video data; and
provide additional content based on the movement analytics to the device for display using the augmented reality capabilities of the device,
wherein the additional content includes at least one of an overlay related to the at least one object depicted in the video data or feedback related to the one or more instructions for collecting the video data from the site.

16. The non-transitory computer-readable medium of claim 15, wherein the feedback related to the one or more instructions indicates a different area at the site that the operator of the device is to position within the field of view of the camera.

17. The non-transitory computer-readable medium of claim 15, wherein the feedback related to the one or more instructions indicates a suggested change in vantage point for the operator of the device.

18. The non-transitory computer-readable medium of claim 15, wherein the one or more instructions, when executed by the one or more processors, further cause the one or more processors to:
- detect, based on one or more of the movement analytics or the contextual data, a circumstance of interest relating to the at least one object,
  - wherein the overlay indicates that the operator of the device is to focus the field of view of the camera on the at least one object based on detecting the circumstance of interest relating to the at least one object.

19. The non-transitory computer-readable medium of claim 15, wherein the data feed received from the device further indicates a tracked three-dimensional position for the at least one object depicted in the video data based on a registration of the at least one object that is determined using the augmented reality capabilities of the device.

20. The non-transitory computer-readable medium of claim 15, wherein the contextual data includes one or more audio inputs, text-based inputs, or gesture-based inputs that are based on the one or more observations by the operator of the device.

* * * * *